Oct. 25, 1949.   C. F. HAMMANN   2,485,595
MACHINE FOR APPLYING PLASTIC MATERIAL
Original Filed Oct. 20, 1943   10 Sheets-Sheet 1

INVENTOR.
Carl F. Hammann
BY M C Metcalf

Oct. 25, 1949.  C. F. HAMMANN  2,485,595
MACHINE FOR APPLYING PLASTIC MATERIAL
Original Filed Oct. 20, 1943  10 Sheets-Sheet 3

INVENTOR.
Carl F. Hammann
BY M C Metcalf
Agent

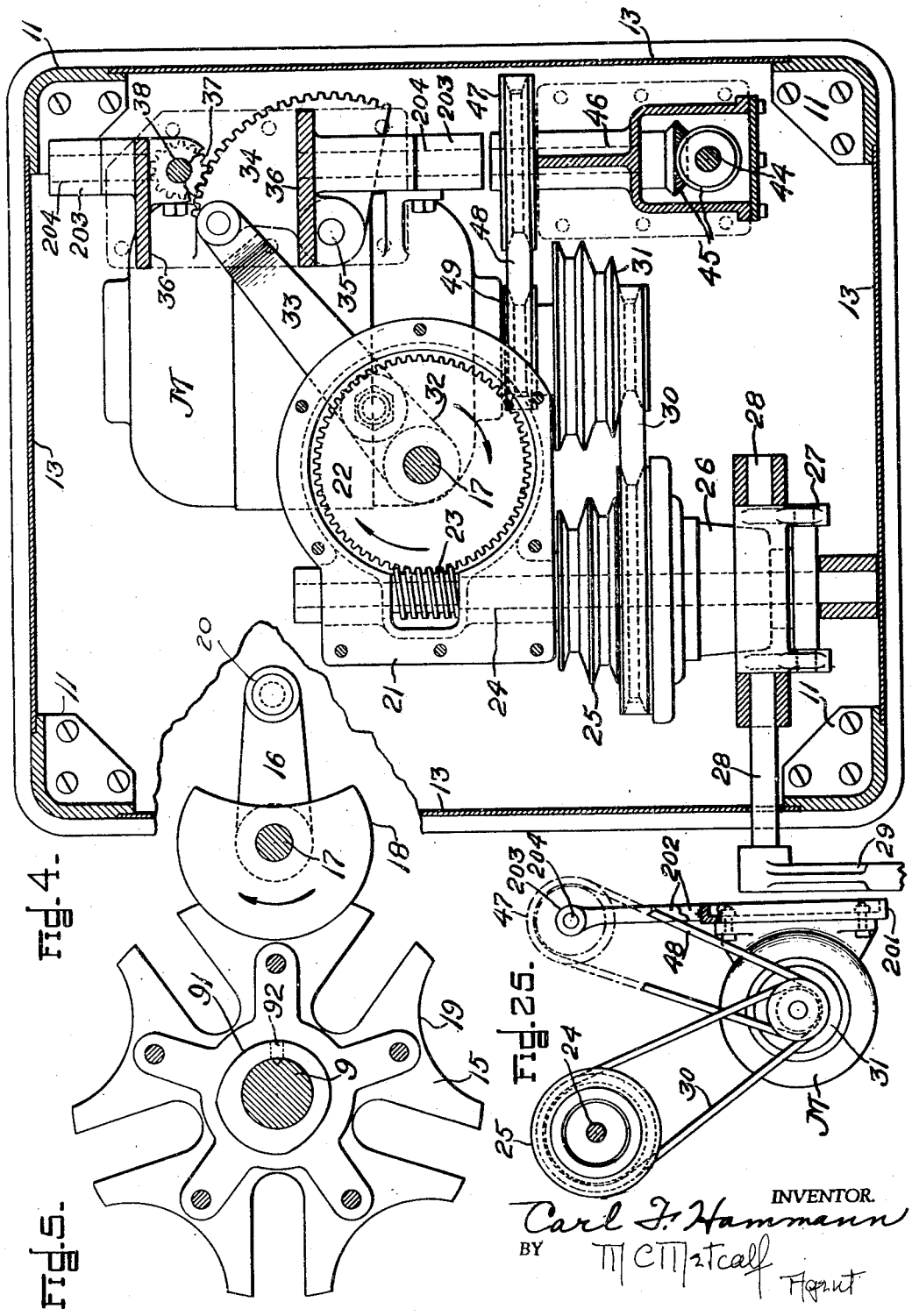

Oct. 25, 1949.　　　C. F. HAMMANN　　　2,485,595
MACHINE FOR APPLYING PLASTIC MATERIAL
Original Filed Oct. 20, 1943　　　10 Sheets-Sheet 5
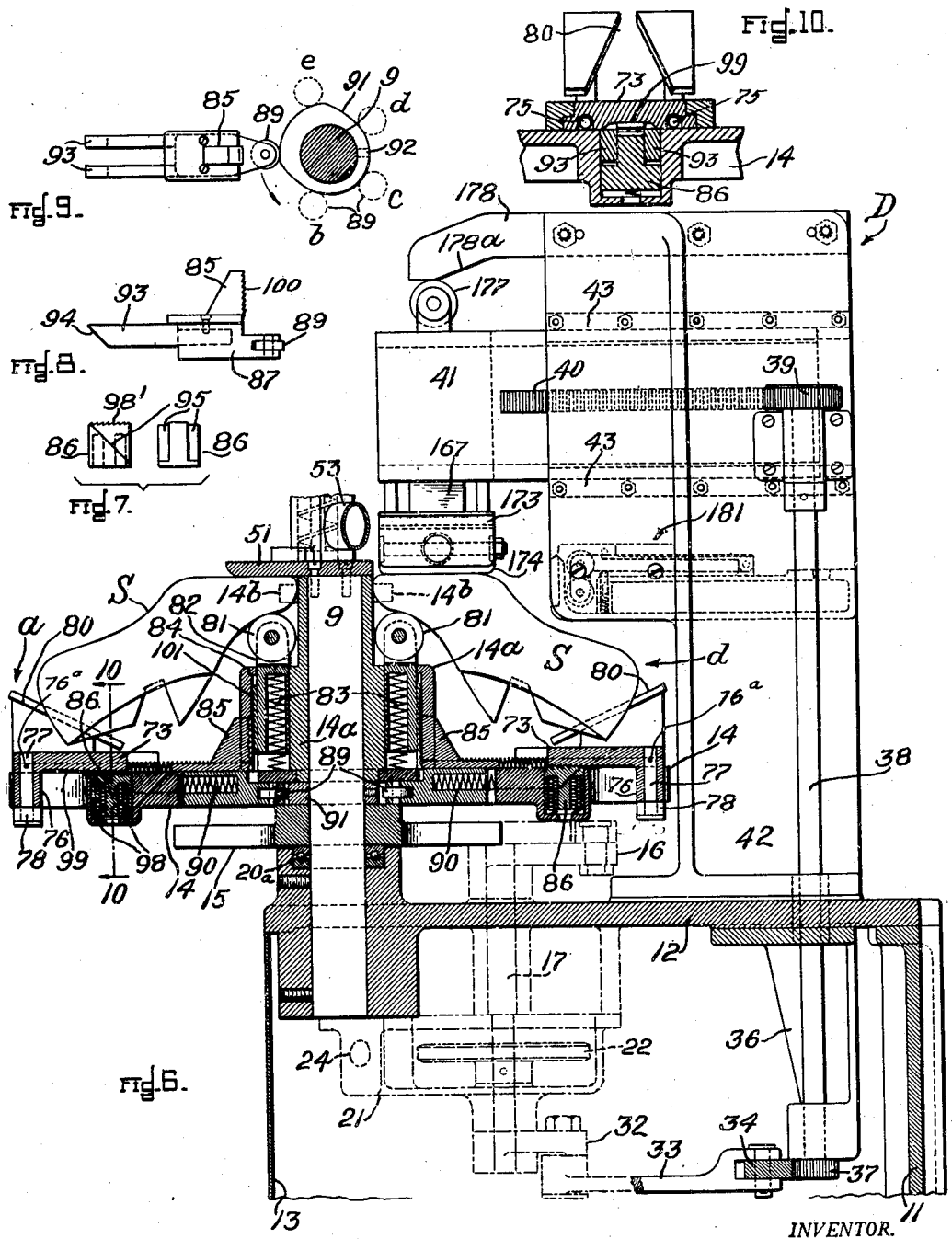
INVENTOR.
Carl F. Hammann
BY M C Metcalf Oct. 25, 1949.        C. F. HAMMANN        2,485,595
MACHINE FOR APPLYING PLASTIC MATERIAL
Original Filed Oct. 20, 1943        10 Sheets-Sheet 6
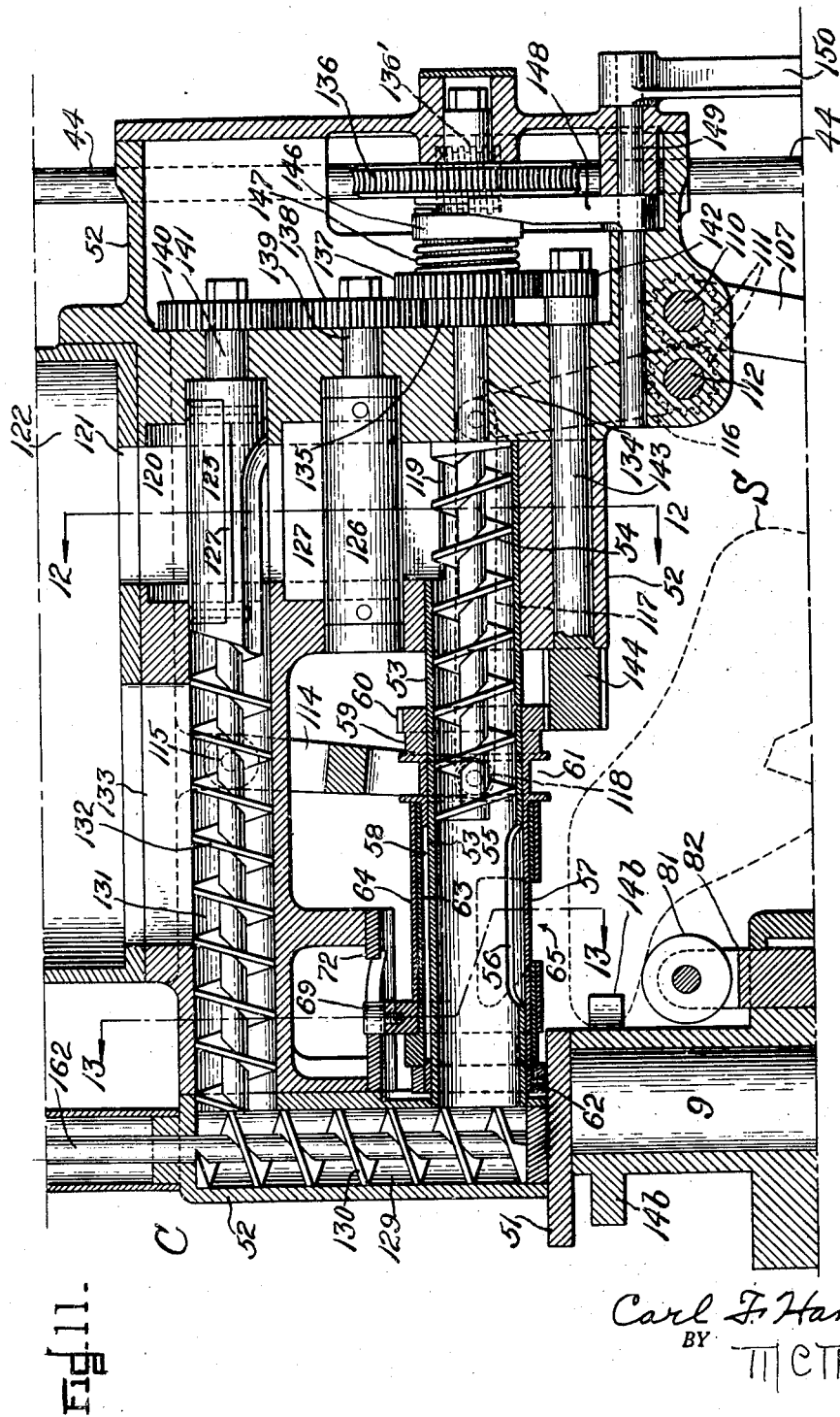
Fig. 11.
INVENTOR.

Oct. 25, 1949.                C. F. HAMMANN                2,485,595
                    MACHINE FOR APPLYING PLASTIC MATERIAL
Original Filed Oct. 20, 1943                        10 Sheets-Sheet 7
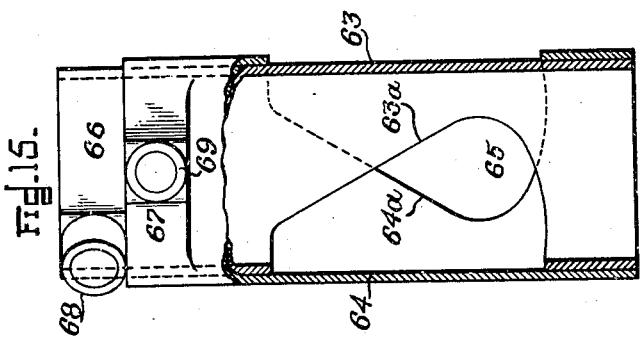
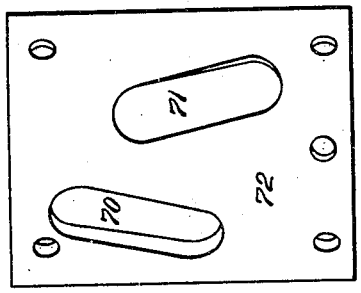
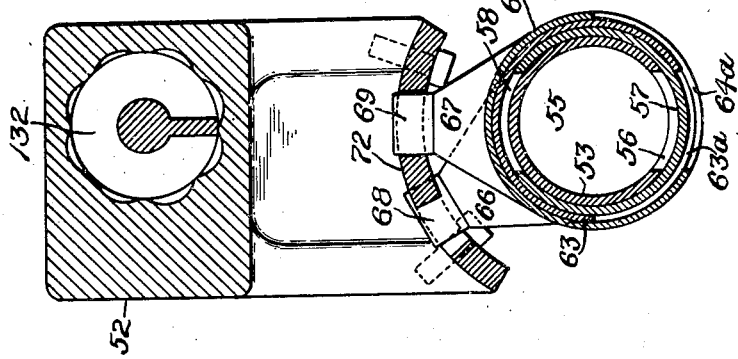
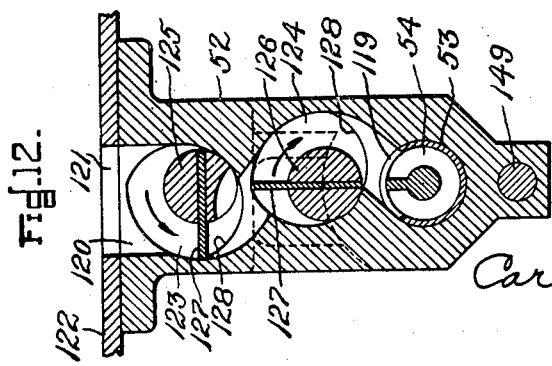
INVENTOR
Carl F. Hammann
BY M C Metcalf Oct. 25, 1949.  C. F. HAMMANN  2,485,595
MACHINE FOR APPLYING PLASTIC MATERIAL
Original Filed Oct. 20, 1943  10 Sheets-Sheet 8
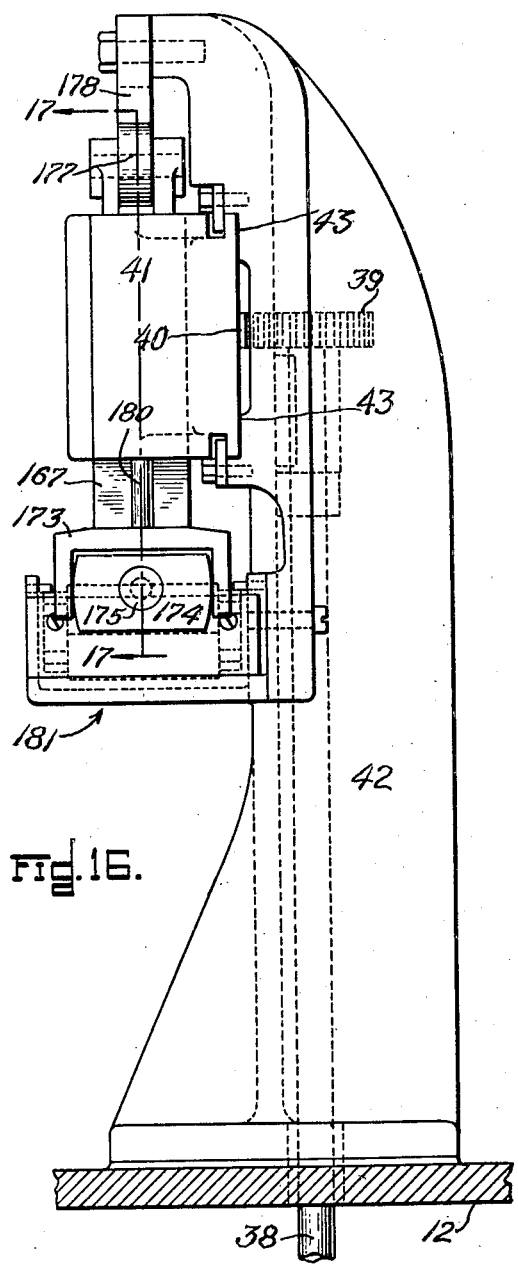
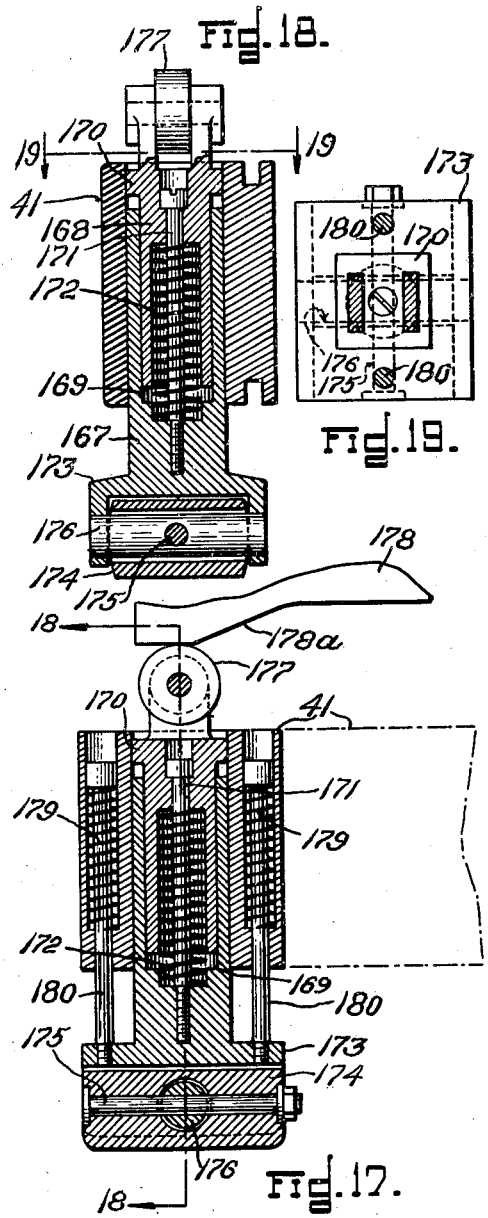
INVENTOR.
Carl F. Hammann
BY M C Metcalf Oct. 25, 1949.  C. F. HAMMANN  2,485,595
MACHINE FOR APPLYING PLASTIC MATERIAL
Original Filed Oct. 20, 1943  10 Sheets-Sheet 9
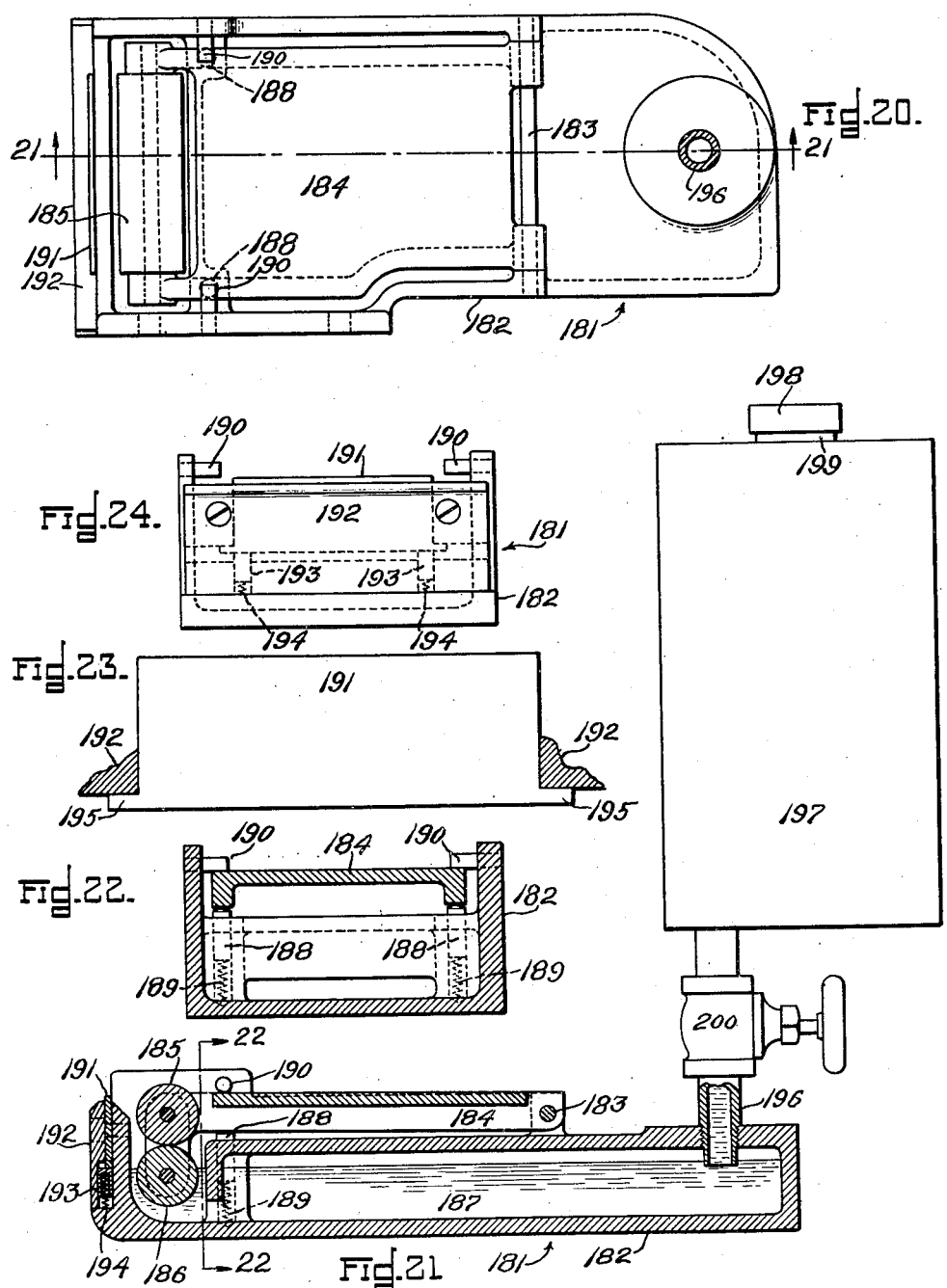
INVENTOR.
Carl F. Hammann
BY  M C Metcalf Oct. 25, 1949.   C. F. HAMMANN   2,485,595
MACHINE FOR APPLYING PLASTIC MATERIAL
Original Filed Oct. 20, 1943   10 Sheets-Sheet 10
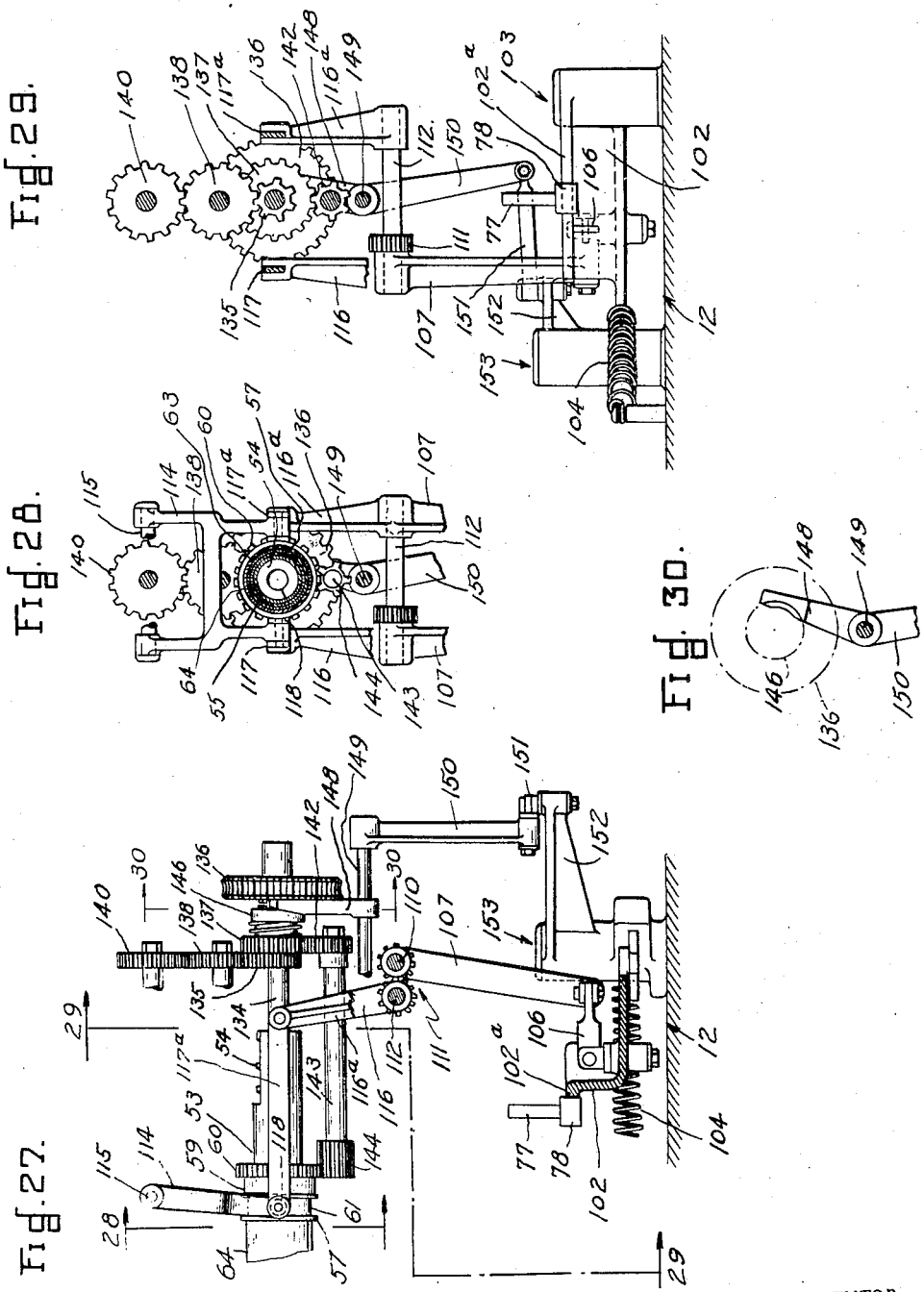
INVENTOR.
Carl F. Hammann
BY M C Metcalf Patented Oct. 25, 1949

2,485,595

UNITED STATES PATENT OFFICE 2,485,595

MACHINE FOR APPLYING PLASTIC MATERIAL

Carl F. Hammann, Boston, Mass., assignor to North American Research Corporation, Cambridge, Mass., a corporation of Massachusetts Original application October 20, 1943, Serial No. 506,931, now Patent No. 2,452,565, dated November 2, 1948. Divided and this application July 19, 1947, Serial No. 762,136

10 Claims. (Cl. 12—79.6)

This invention relates to apparatus for applying plastic material to articles, and more particularly to machines for applying filler material to the bottoms of shoes.

The present invention is a division of copending application Serial No. 506,931, filed October 20, 1943, which issued on November 2, 1948, as Patent No. 2,452,565. For subject matter shown and described but not claimed in the present and parent application reference is made to other copending divisional applications Serial No. 762,135, filed July 19, 1947, and Serial No. 762,137, filed July 19, 1947.

It is the general object of the invention to provide an automatic machine of this type which will serve its purpose expeditiously and efficiently while requiring a minimum of attention.

In one of its aspects, the invention has the object of providing a machine for applying to articles of varying size, such as shoes, an amount of plastic material which is determined by the size of each individual article. In another aspect, the invention has the object of providing a machine to which shoes can be delivered one at a time, which applies to each shoe a quantity of filler material predetermined in accordance with its measured size, which then spreads and irons this material and distributes it over the area where it is needed, and which then presents for removal the shoe with the filler properly applied thereto.

Other features of the invention are a shoe holding mechanism which not only permits easy application of a shoe and secure holding thereof during the working period proper, but also gauging of the shoe size; a mechanism which permits predetermination of amounts of plastic material; an arrangement for delivering that amount of material; a device interlinking the shoe holding mechanism with the mechanism for predetermining the amount of material; mechanism controlling the delivery of a predetermined amount of material, and only when the shoe has arrived in proper position to receive it; and mechanism for spreading, distributing and ironing the material while preserving the metered amount thereof.

These and other objects, aspects and features will be more fully apparent from the following description of several practical embodiments illustrating the genus of the invention. The description refers to drawings in which:

Fig. 4 is a section on line 4—4 of Fig. 2 through the base of the machines;

Fig. 5 is a detail, in plan, of part of the turret head actuating mechanism;

Fig. 6 is a section on line 6—6 of Fig. 1 with the filler-spreading and distributing mechanism shown in elevation;

Fig. 7 shows a front and side elevation of the horizontal latch which is part of the jack mechanism shown in Fig. 6;

Fig. 8 is an elevation of the vertical latch also shown in Fig. 6;

Fig. 9 is a top view of the cam mechanism for controlling the jack mechanism, also shown in Fig. 6;

Fig. 10 is a partial section on line 10—10 of Fig. 6, through the jack mechanism;

Fig. 11 is an enlarged vertical section view of parts of the filler material feeding and delivering mechanism shown in Fig. 2;

Fig. 12 is a section through the feeding mechanism, on line 12—12 of Fig. 11;

Fig. 13 is a section through the delivering mechanism, on line 13—13 of Fig. 11;

Fig. 14 is a detail of the fixed valve-adjusting cam forming part of the delivery-controlling valve mechanism shown in Figs. 2, 11 and 13;

Fig. 15 is a plan view, partly in section, of the delivery valve;

Fig. 16 is an end elevation of part of the mechanism which spreads, irons and distributes the filler material deposited upon a shoe by the mechanism shown in Fig. 11;

Fig. 17 is a section, through the slide of the filler distributing mechanism, on line 17—17 of Fig. 16;

Fig. 18 is a similar section, normal to that of Fig. 17, on line 18—18 of Fig. 17;

Fig. 19 is a horizontal section, through the upper part of the distributing mechanism, on line 19—19 of Fig. 18;

Fig. 20 is a top plan view of part of the mechanism for lubricating the spreading iron;

Fig. 21 is a section on line 21—21 of Fig. 20 including parts of the lubricating mechanism which are omitted from Fig. 20;

Fig. 22 is a section, through the lubricant container and roller carrier, on line 22—22 of Fig. 21;

Fig. 23 is an elevation of the doctor blade forming part of the lubricating mechanism shown in Figs. 20 and 21;

Fig. 24 is an end elevation of the lubricating mechanism shown in Fig. 20;

Fig. 25 is a detail view of the drive, from the motor to the main driving pulleys, also shown in Fig. 4;

Fig. 26 is a vertical section through the feeding clutch mechanism shown in Fig. 11;

Fig. 27 is a detail view of the linkage between shoe jack and filler mechanisms as shown in Fig. 2, with the frame omitted:

Fig. 28 is a section on line 28—28 of Fig. 27;

Fig. 29 is a section on line 29—29 of Fig. 27; and

Fig. 30 is a section on line 30—30 of Fig. 27.

Figure 1:
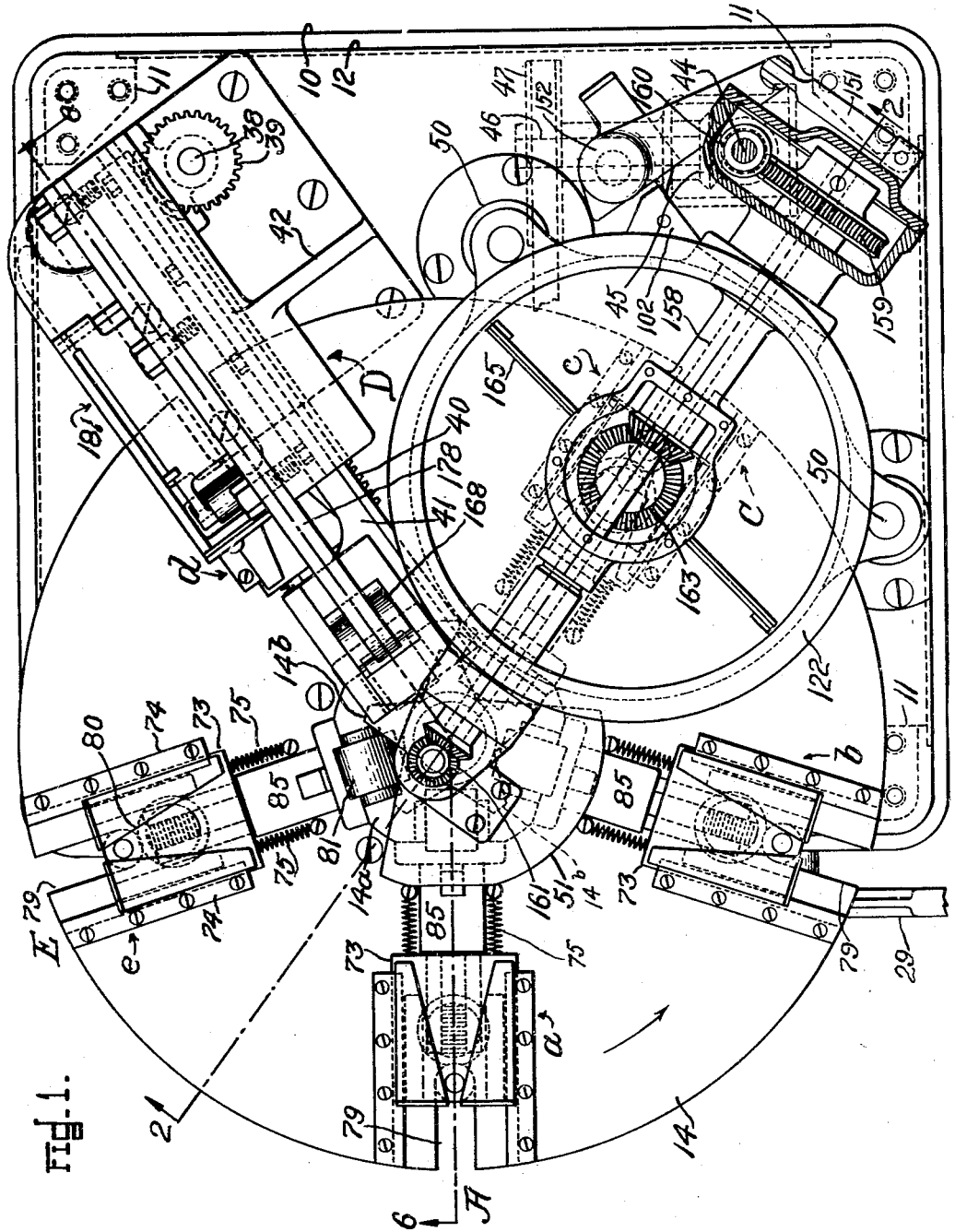
Fig. 1 is a top plan view, partly in section, of a machine for applying filler material to shoe bottoms and constructed in accordance with this invention.
Figure 2:
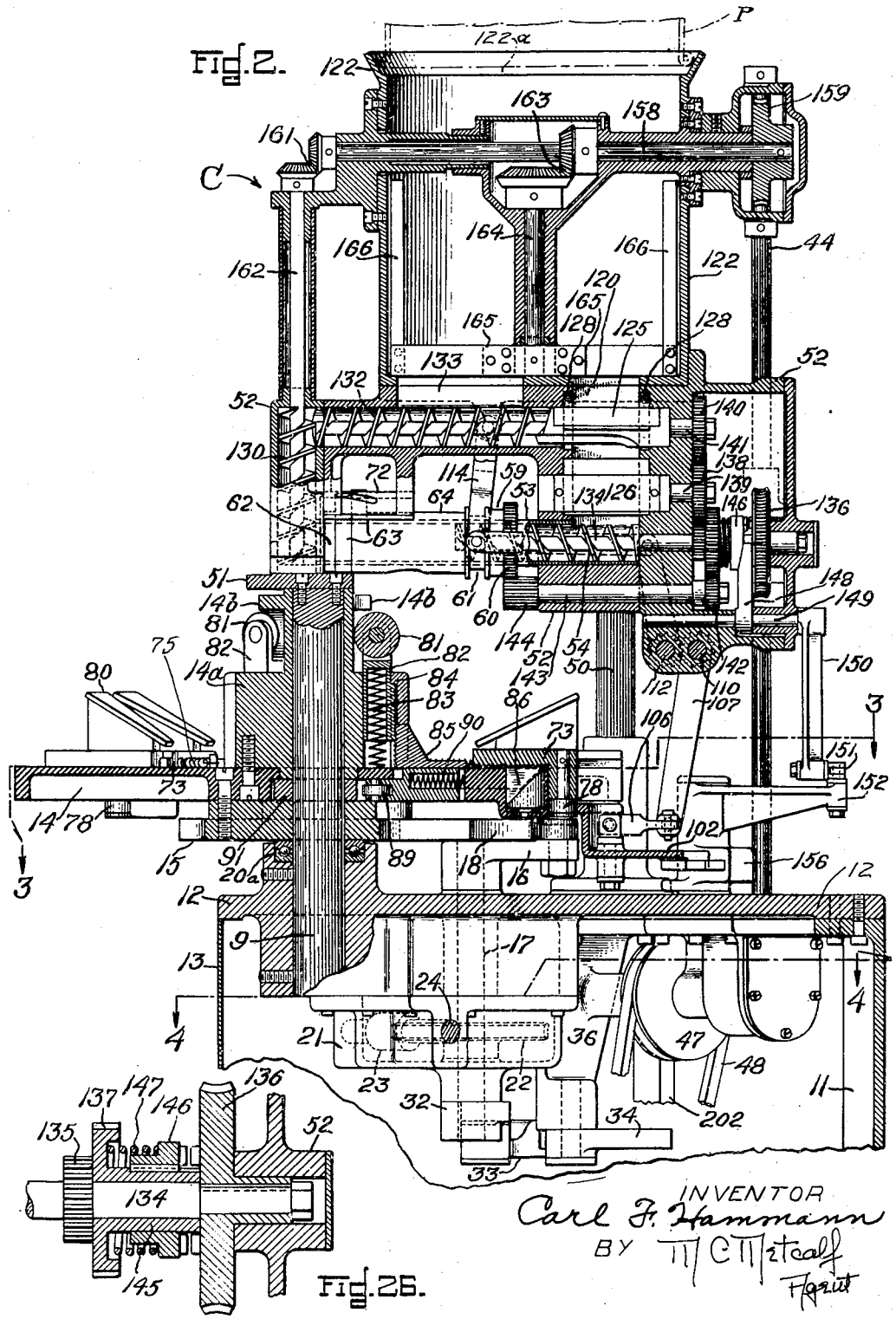
Fig. 2 is a section on line 2—2 of Fig. 1 omitting the lower portion of the base of the machine and the driving motor housed therein.

The illustrated embodiment of my invention comprises a base consisting of a rectangular boxlike frame having a bottom wall 10 (Figs. 1, 3 and 4) to which are secured the lower ends of four corner posts 11 whose upper ends abut and are fastened to the under side of a top wall 12 (Figs. 1, 2 and 6). To the corner posts 11 are secured sheet metal side walls 13 providing a closed chamber within which certain parts of the machine are housed.

Rigidly fixed at its lower end to the top wall 12 by means of set screws (Fig. 2) is an upstanding pivot post 9 on which is rotatably mounted a turret head 14 driven by a Geneva motion mechanism as follows. To the bottom of head 14 is fastened a centrally disposed radially slotted wheel 15 (Figs. 2 and 5) which is intermittently engaged by a roll 20 mounted upon the free end of an arm 16 carried by a vertical shaft 17. This arm is continuously rotating while the machine is operating and acts through the slotted wheel 15 to impart to the turret head 14 contraclockwise (Fig. 1) step by step movement. A circular segment 18 (Figs. 2 and 5) forming part of arm 16 cooperates with arcuate recesses 19 provided upon the periphery of wheel 15 to lock said wheel and the rest of the turret head between the steps of the movement. In the embodiment shown five step movements are imparted to the turret head to effect one complete revolution thereof.

Shoe supporting means, in the present embodiment five jack mechanisms, may be provided at a, b, c, d and e (Fig. 1) upon the top side of turret head 14, spaced thereon at equal angles. One of said jack mechanisms may occupy position a at a loading or receiving station A during a period of rest of the turret head, as shown.

While this jack dwells at station A, a last with a partly made shoe S upon it is placed in position thereon, bottom up, as shown in Fig. 6, the jack mechanism being at that time in unlocked condition so that it can be adjusted to fit the size of the lasted shoe.

The first step of the turret head then moves the loaded jack into idle position b (Fig. 1) and during this movement the loaded jack is locked in its adjusted condition.

The second step of the turret head brings the loaded jack into position at c (Fig. 1) with its shoe S occupying the position indicated by dotted lines in Fig. 11. While the jack and shoe dwell in this position a predetermined metered amount of filler material, in quantity proportionate to the size of the shoe whatever that may be, is automatically deposited upon the forepart of the latter by mechanism indicated generally at C in Figs. 1 and 2.

The third step of the turret head moves the loaded jack into position at d (Fig. 1) and while it dwells in this position the deposited filler material is spread, ironed and distributed over the forepart of the shoe by the mechanism that is indicated generally at D in Figs. 1 and 6.

The fourth step of the turret head shifts the jack bearing the filled shoe into position e at a delivery station E and unlocks the jack so that the lasted and filled shoe may be removed from the machine while the jack dwells at station E.

The fifth step of the turret head completes one revolution of the same and restores the now empty and unlocked jack to position a at the loading station A.

The hub 14a of the turret head, including the slotted wheel 15, rests upon and is supported by a ball bearing 20a (Fig. 2) mounted within a recess provided in top wall 12.

The vertical shaft 17 which carries the turret-actuating arm 16 is journalled in two bearings one of which is provided on top wall 12 and the other on a gear housing 21 secured to the bottom side of the top wall. Within this housing, and fixed on shaft 17, is a worm gear 22 (Figs. 2 and 4) that is driven by a worm 23 fast on a horizontal shaft 24 journalled at its one end in a bearing on housing 21 and at its opposite end in a bearing provided upon the bottom side of top wall 12.

Shaft 24 has loosely mounted on it a stepped pulley 25 constituting one member of a clutch whose other half 26 is splined on said shaft 24. Clutch member 26 is shifted into and out of engagement with the stepped pulley by means of a manually operated shipper member including a yoke 27, shaft 28 and handle 29 (Figs. 1 and 4), the latter being disposed on the outside of the box-like base of the machine within reach of the operator at loading station A, and the shaft 28 being journalled in bearings provided upon the under side of the top wall 12 of the base.

The stepped pulley 25 (Fig. 4) is connected by a belt 30 with a complementary stepped pulley 31 fast on the shaft of an electric motor M which is started and stopped by means of a switch (not shown). This motor is the source of power for all operating parts of the machine.

The motor M (Figs. 4 and 25) is secured to a frame 201 having a pair of upwardly extending arms 202 provided at their upper ends with eyes 203 loosely pivoted upon trunnions 204 projecting from opposite sides of the bracket 36. Thus a substantial part of the weight of motor M is borne by the belt 30 which is thereby maintained tight at all times, while the axes of pulley 47 and trunnions 204 are in alignment so that the tightness of belt 48 is not affected by swinging movement of frame 201 on the axes of the trunnions.

While the machine is in use the motor M is running continuously and acts through the connections described continuously to rotate the stepped pulley 25. When the clutch member 26 occupies its set position and motor M is running, the stepped pulley 25 continuously rotates worm gear 22 (Fig. 4) shaft 17 and arm 16 (Fig. 5) in the direction of the arrows, through clutch member 26, shaft 24 and worm 23.

Fixed to the lower end of the continuously rotating vertical shaft 17 is a second crank arm 32 (Figs. 2, 4 and 6) which by means of a connecting rod 33 continuously rocks a gear segment 34 that is pivotally supported at 35 upon a bracket 36 secured to the under side of the top wall 12 of the base. Gear segment 34 meshes with a pinion 37 fixed upon the lower end of a vertical rockshaft 38 (Figs. 1, 4, 6 and 16). This rockshaft is journalled near its lower end in a bearing provided upon bracket 36 from which it extends upwardly through the top wall 12 and is provided at its upper end with a pinion 39 meshing with a rack 40 provided upon one side of a horizontally movable slide 41 (Figs. 1 and 6) The upper end of shaft 38 is journalled in a bearing provided upon one side of an upstanding bracket 42 that is fixed rigidly in position upon the top wall 12 and has horizontal ways 43 (Figs. 6 and 16) supporting slide 41.

It will be clear that as shaft 17 is driven to rotate the turret head step by step, it also, through the connections described, reciprocates the slide 41 five times during each revolution of the turret head, in timed relation with respect to the step movements of the latter. Slide 41 is part of the mechanism D provided for leveling and distributing the deposited filler material just before the filled shoe is removed from the machine. During each period of rest of the turret head a shoe, on which a metered quantity of filler material has been deposited, dwells in position to be operated upon by slide 41 of mechanism D as shown in Fig. 6, and described in detail below.

The mechanism by which a metered quantity of filler material is deposited upon the forepart of each shoe is indicated generally at C in Figs. 1 and 2 and includes a continuously rotating vertical shaft 44 (Figs. 1, 2 and 4) journalled near its lower end in a bearing provided upon the under side of top wall 12, and near its upper end in a bearing provided upon the framework of said mechanism C. At its lower end shaft 44 is connected by miter gears 45 (Fig. 4) with one end of a short horizontal shaft 46 journalled in a bearing provided upon the under side of top wall 12. At its opposite end this short shaft carries a pulley 47 connected by a belt 48 with a pulley 49 fast on the armature shaft of motor M. Thus vertical shaft 44, which is the main drive shaft for mechanism C, is continuously rotated while the motor is operating.

The frame 52 of the filler depositing mechanism C is supported in part by the pivot post 9 (Fig. 2) and in part by two posts 50, 50 (Figs. 1 and 2) projecting upwardly from the top plate 12 of the base. Rigidly fastened in position upon the top of pivot post 9 is a gauge plate 51 on which the front portion of the frame 52 of the filler depositing mechanism rests and to which it is fastened by screws as shown in Fig. 1.

The frame 52 of the filler depositing mechanism includes, as a rigid part thereof, a horizontal tubular portion or element 53 (Figs. 11, 12 and 13) whose interior provides a cylindrical chamber one end of which is occupied by a feed screw 54 while the opposite end portion provides a delivery chamber 55 which is normally filled with plastic filler material under pressure created by the screw which is continuously rotated as described later. At the bottom of the delivery chamber 55 the fixed tubular frame element 53 has a longitudinal outlet slot 56 which is normally maintained closed by a valve sleeve 57 made at its top with a delivery port in the shape of a longitudinal slot 58. This valve sleeve is normally stationary but is mounted on the tubular frame element 53 for rotary and also axial movement thereon.

At its one end valve sleeve 57 has a head 59 (Figs. 2 and 11) formed with a gear 60 and with a circumferential groove 61. Fixed in position upon the opposite end of said valve sleeve is a collar 62 between which and head 59 are arranged two ported gate sleeves 63 and 64 rotatably mounted one within the other (Figs. 11, 13 and 15). Sleeves 63 and 64 have opposed ports 63a and 64a, respectively, which overlap and jointly define a variable outlet or delivery passage 65 (Fig. 15) that is permanently disposed directly beneath the outlet 56 of chamber 55. It will be clear that by rotatively adjusting the metering sleeves 63 and 64 in opposite directions the size and capacity of the delivery passage 65 will be increased or diminished. It will also be clear that if the cutting delivery valve sleeve 57 is rotated one revolution its port 58 will pass between outlet 56 of member 55 and the composite delivery passage 65 of valve sleeves 63 and 64, with the result that filler material is delivered through passage 65 in amount proportionate to the size of passage 65.

At the conclusion of each step movement of turret head 14 a lasted shoe is brought into position at c (Fig. 1) where the forepart of the shoe dwells for a period of time directly beneath the composite outlet passage 65, as indicated by dotted lines in Fig. 11. During the following period of rest of turret 14, the valve sleeve 57 is automatically slid axially on the tubular frame element 53 toward the right (Fig. 11) for a purpose that will presently appear, whereupon one complete revolution is imparted to it which carries its port 58 (Figs. 11 and 13) past and between the vertically aligned outlets 56 and 65. As the port 58 passes between these outlets a predetermined quantity of the plastic filler material is discharged under pressure from the chamber 55 on to the forepart of the shoe.

Adjacent to the collar 62 (Fig. 11) the sleeves 63 and 64 carry radial arms 66 and 67, respectively (Fig. 13), provided at their outer ends with cam rolls 68 and 69, respectively. These cam rolls engage relatively oblique cam slots 70 and 71 (Fig. 14) formed in an arcuate cam plate 72 fixed on the frame 52 of the filler depositing mechanism. When valve sleeve 57 is axially moved as above described, it carries the two sleeves 63 and 64 with it thereby moving the cam rolls 68 and 69 lengthwise of the stationary cam slots 70 and 71 with the result that the two sleeves are rotatively adjusted relatively to each other in opposite directions, thereby enlarging the outlet 65 (Fig. 15) to a degree proportionate to the extent of such axial movement. As will appear later the extent of this axial movement is proportionate to the length size of the lasted shoe.

As a shoe is brought into the position indicated by dotted lines in Fig. 11, the delivery passage 65 (Fig. 15) is adjusted to a size appropriate to the size of the shoe, and when the shoe is moved away from this position after the delivery of filler material has been effected, the three sleeves are automatically returned into normal positions, sleeves 63 and 64 being rotated in the opposite sense thereby restoring the delivery passage to its normal minimum size shown in Fig. 15. The means for automatically shifting the three sleeves 56, 63 and 64 axially on the tubular frame element 53 in the manner just set forth will presently be described.

Figure 3:
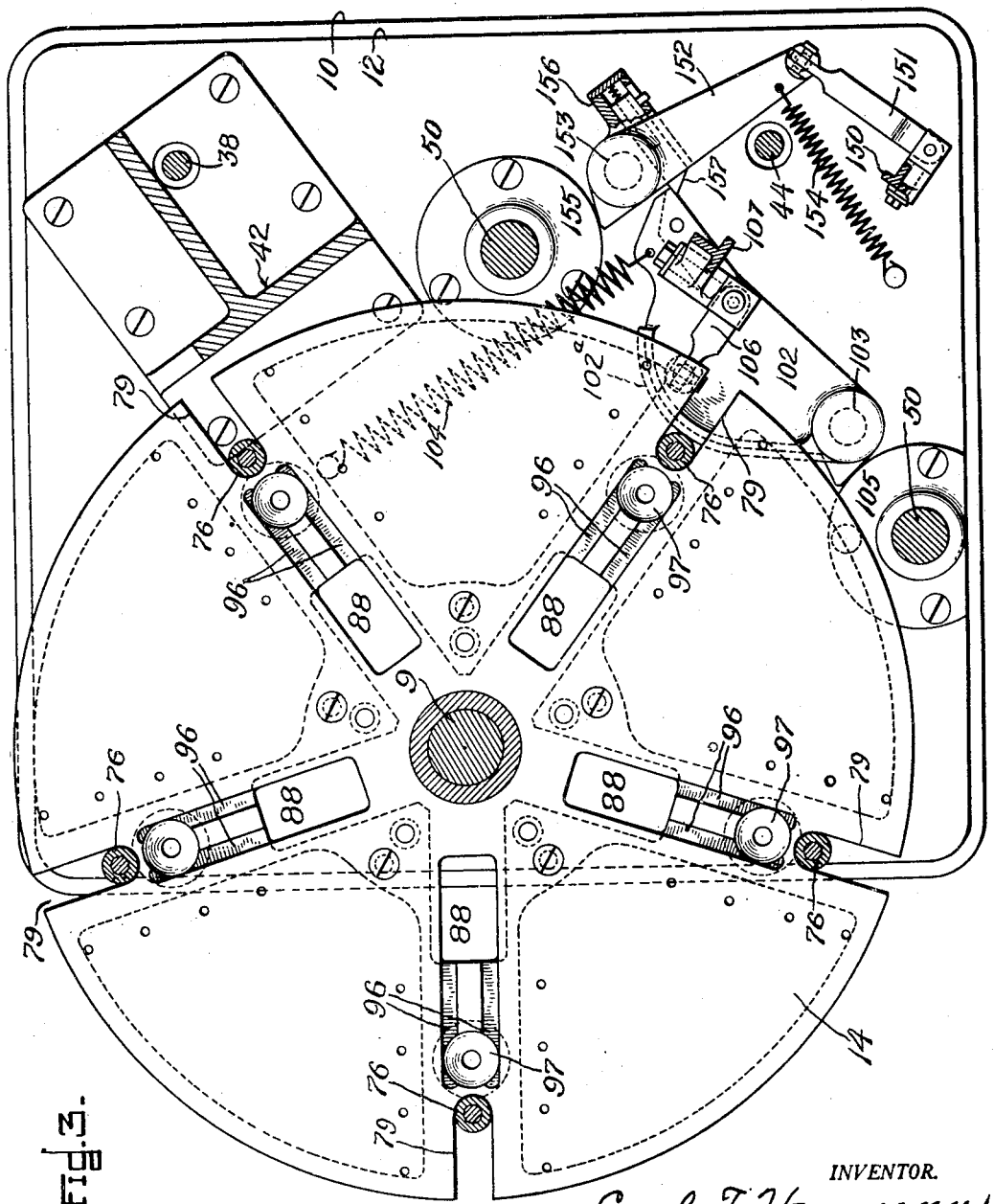
Fig. 3 is a section on line 3—3 of Fig. 2 with parts of the shoe-supporting jack mechanism removed.

Each jack mechanism comprises a heel rest 73 (Figs. 1 and 6) mounted to slide radially in ways 74 provided upon the top side of turret head and yieldingly urged toward the axis of the latter by a pair of springs 75. Upon its under side, and near its outer end, each heel rest slide has a depending tubular boss 76 within which is fixed a pintle 77 provided at its lower end with an abutment roll 78 (Figs. 3, 6 and 27). The pintle 77 is fixed within boss 76 by a transverse pin 76a with which the outer ends of the springs 75 are connected, the outer end portions of said springs loosely occupying grooves provided upon the bottom side of the heel rest shown in Fig. 10. The inner ends of the springs are fastened to the top of the turret head as shown in Fig. 1.

The boss 76 occupies a radial slot 79 (Fig. 3) formed in turret head 14 and the engagement of the boss with the inner end of this slot limits the inward movement of the heel-rest under the influence of springs 75.

Upon its top side each heel-rest has a V-shaped heel-receiving crotch 80 (Figs. 1, 6 and 10) which is inclined downwardly toward, and faces, the axis of the turret head and into which the heel end of a lasted shoe is wedged so that the shoe is disposed bottom side uppermost and extends upwardly and inwardly therefrom toward the axis of the turret head, with the inner toe end of the lasted shoe abutting the hub of the turret head and supported against the under side of gauge 51 by a toe-rest herein shown as including a roll 81. This roll is supported for rotation on a horizontal axis which is perpendicular to the medial line of the lasted shoe, the roll being mounted within the bifurcated upper end of a slide 82 mounted within vertical ways provided in hub 14a of the turret head. The lower portion of slide 82 has a vertical bore within which is arranged a coiled spring 83 by which the slide is yieldingly urged upwardly toward, and sometimes against, a stop shoulder 84 (Fig. 2), the lower end of said spring abutting the top of the turret head.

Adjacent to the upper end thereof the hub of the turret head has a plurality of radial lugs 14b (Figs. 1 and 6) which provide between them V-shaped sockets one of which is disposed immediately above each roll 81 to receive and hold against sidewise displacement, the toe end of the lasted shoe that is in engagement with said roll.

When an empty jack mechanism arrives at the loading station A, its roll-carrying slide 82 is supported in position against its stop 84 by spring 83 as shown in Fig. 2, while the heel-rest 73 is held by springs 75 at the limit of its inward movement with boss 76 against the inner end of its slot 79 and roll 78 at the lower end thereof occupying an inoperative position as shown in Figs. 2 and 3.

While the empty jack mechanism dwells at the loading station A (Fig. 1) the operator places the heel end of a lasted shoe within and against the crotch 80 of the heel-rest slide and forces the latter radially outwardly until it is possible to shove the toe end of the lasted shoe into position against the hub of the turret head between the gauge plate 51 and the toe-supporting roll 81 as shown in Fig. 6, the operator adjusting the heel end vertically relatively to the heel-rest, if necessary, to set the bottom of the forepart in an approximately horizontal position. When properly placed in position the toe end of the lasted shoe will occupy a position between two of the lugs 14b by which it is held against sidewise displacement. When the lasted shoe is in position the roll 78, which was displaced radially outwardly when the lasted shoe was applied to the jack mechanism, occupies an operative position with respect to a cam lever 102 (Fig. 3) that is actuated by roll 78 when the respective jack mechanism arrives at the position c. Actuation of cam lever 102 by roll 78 causes the devices presently to be described to effect axial adjustment of valve sleeve 59 (Figs. 11, 27, 28 and 29) as described; to adjust the sleeves 63 and 64; and to impart a single revolution to valve sleeve 59, while the loaded jack mechanism dwells at c.

As the loaded jack mechanism is moved from the position at a (Fig. 1) to the position at b, the two slides 73 and 82 (Fig. 6) are automatically locked in their adjusted positions as presently to be described and remain so locked until the loaded jack moves from the position at d (Fig. 1) to the position at e, whereupon they are automatically unlocked to permit removal of the filled shoe and its last at station E.

The mechanism for locking the two slides 73 and 82 of each jack mechanism in the positions to which they are adjusted while as station A by application thereto of the lasted shoe comprises two spring pressed latches 85 and 86 (Figs. 6, 8 and 9), the former cooperating with the roll-carrying slide 82 and the latter with the heel-rest slide 73.

The latch 85 is a slide made with a base section 87 slidably mounted within a radial slot 88 (Fig. 3) formed in turret head 14, the base portion being provided upon opposite sides thereof with flanges seated upon the top surface of the turret head. At its inner end the base section 87 is provided with a cam roll 89 which is urged by a spring 90 toward a cam 91 fastened rigidly to the stationary pivot post 9 by a set screw 92 (Fig. 9). The outer end of the base 87 of latch slide 85 has a pair of blade extensions 93 (Figs. 8 and 9) made at their outer ends with inclined cam surfaces 94 cooperating with complementary cam surfaces 95 (Fig. 7) provided upon latch 86 upon opposite sides thereof. The blade extensions 93 are slidably mounted within a pair of grooves 96 (Fig. 3) constituting a radial track in the top of the turret head. At the outer ends of these grooves the turret head is provided with a cylindrical pocket 97 having an apertured bottom wall as shown in Fig. 6.

The latch 86 is loosely fitted within this pocket 97 together with a pair of springs 98 by which the latch is urged upwardly. As shown in Figs. 6 and 7 the upper end of latch 86 has a radially disposed rack of teeth 98 cooperating with a radial rack of teeth 99 provided upon the bottom of heel-rest slide 73. As shown in Figs. 6 and 8 the latch 85 is provided with a vertical rack of teeth 100 cooperating with a vertical rack of teeth 101 provided upon toe-rest slide 82.

The fixed cam 91 (Fig. 9) is so constructed that, as each jack mechanism moves from d to e, it acts through cam roll 89 to shift latch 85 radially outwardly against the pressure of its spring 90 thereby unlocking toe-rest slide 82, and at the same time the latch 85, through its cam blades 93, depresses latch 86 thereby unlocking heel-rest slide 73. Thereafter the cam 91 maintains both slides 82 and 73 unlocked until the jack mechanism moves from a to b whereupon the cam permits the spring pressed latches to re-engage and lock the slides which remain thus locked until the jack mechanism again moves from d to e.

As will be clear from Figs. 1 and 6 the gauge plate 51 provides a projecting circular segmental flange which occupies a stationary position above the circular path of the forepart of the shoe and is of such angular length that it engages and holds the forepart in position until the loaded jack departs from position b.

Adjacent to position c there is provided the member 102 referred to above (Figs. 2, 3, 27 and 29). This member has the form of a lever which is pivotally mounted at 103 upon the top wall 12 of the base of the machine and normally held by a spring 104 against a stop 105 which may be the flange at the lower end of one of the posts 50. While occupying this normal position the cam face 102a of lever 102 is just outside of the path of the cam rolls 78 of the jack mechanisms as the latter move past this lever while empty. When, however, a jack mechanism holding a lasted shoe arrives at position c its cam roll 78 occupies an operative position farther away from the axis of the turret head, contacts face 102a, and swings cam lever 102 outwardly on its pivot 103 an angular distance proportionate to the size of the shoe on said jack mechanism. It will be observed that the outward radial displacement of cam rolls 78, brought about when the lasted shoes are placed upon the jack mechanisms at station A, varies with the size of the shoes.

Intermediate its ends the cam lever 102 is connected by a universal joint with one end of a link 106 whose opposite end is connected by another universal joint with the lower end of an arm 107 (Figs. 2, 3, 11, 27 and 29) projecting downwardly from a horizontal rockshaft 110 journalled in a bearing provided upon the frame 52 of the filler depositing mechanism C. This rockshaft is connected by spur pinions 111 with a second horizontal rockshaft 112 also journalled in a bearing provided on frame 52. This second rockshaft has fixed to its opposite ends two upwardly extending arms 116, 116a whose upper ends are connected by a pair of links 117, 117a with the opposite legs or branches of a yoke 114 whose upper end is pivotally supported at 115 on frame 52. The legs or branches of yoke 114 are provided at their lower ends with rolls 118 occupying the groove 61 of the head 59 of sleeve valve 57.

It will thus be seen that when a loaded jack mechanism arrives at position c (Figs. 1, 2 and 3) the angular displacement of lever 102 due to the engagement therewith of roll 78 of the jack mechanism, acts through the linkage just described to adjust sleeve valve 57 and the two sleeves 63 and 64 axially relatively to the fixed cam plate 72 thereby enlarging the outlet passage 65 (Fig. 15) to a size appropriate for the size of the shoe carried by the jack mechanism.

The fixed tubular frame element 53 (Figs. 11 and 12) has adjacent to its one end and at its top an inlet port 119 in register with the lower end of a conduit 120 formed in frame 52, the upper end of this conduit being in register with an outlet 121 provided through the bottom wall of a hopper 122 adapted to hold a supply of plastic filler material. Intermediate its upper and lower ends this conduit has two enlargements or chambers 123 and 124 within which are arranged, respectively, rotatably supported paddle-carriers 125 and 126. Each of these carriers has a longitudinal transverse slot within which is loosely fitted a paddle blade 127 so that it is movable edgewise transversely or radially with respect to the axis of its carrier. Recesses 128 at opposite sides of chambers 123 and 124 provide cam surfaces engaging the opposite ends of the blades to move the same back and forth as the carriers are rotated in the directions of the arrows in Fig. 12.

The 90° arcuate portions of these recesses to which the reference numerals 128 are applied in Fig. 12 are the only portions of the recesses 123 and 124 which serve as blade-adjusting cams and each of these cam portions acts upon its blade to reverse the position thereof during each half-revolution of the same.

While the paddles are continuously rotating the filler material is delivered into the upper end of the conduit 120 and is forced downwardly through the latter by the paddles and delivered into the tubular frame element 53 through inlet 119 (Figs. 11 and 12). Upon its entrance into the tubular frame element 53 the filler material is forced lengthwise of the latter by the continuously rotating feed screw or worm 54 into the chamber 55. Filler material that is thus forced into chamber 55, except the portions thereof deposited upon the shoes, is discharged from tubular frame element 53 into a vertical cylindrical chamber 129 containing a continuously rotating feed screw 130 by which it is propelled to the upper end of that chamber where the latter is provided at one side thereof with an outlet through which the material is delivered into one end of a horizontal cylindrical chamber 131. Within the latter is arranged a continuously rotating feed screw which is an integral part of the blade-carrier 125 toward which the material is forced by the feed screw, some of the material being returned to hopper 122 through an inlet 133 and some passing alongside of said blade-carrier into conduit 120.

Feed screw 54 (Fig. 11) is at one end connected to a shaft 134 journalled in a bearing on frame 52 and on this shaft are fixed a pinion 135 and a worm gear 136 between which is provided a spur gear 137 that is loosely mounted on the shaft. Worm gear 136 is continuously driven by a worm 136' (Figs. 11 and 27) fast on the vertical shaft 44 hereinbefore referred to. The pinion 135 continuously drives a gear 138 fast on a shaft 139 projecting from one end of blade carrier 126 and gear 138 continuously drives a gear 140 fast on a shaft 141 projecting from one end of blade carrier 125.

The loose gear 137 (Figs. 11 and 27) is normally at rest and meshes with a pinion 142 fast on one end of a horizontal shaft 143 journalled in a bearing on frame 52 and carrying at its opposite end an elongate pinion 144 meshing with the gear 60 of the rotary sleeve valve 57. It will be clear that gear 60 always remains in mesh with the elongate pinion 144, however, the sleeve valve 57 is adjusted axially by the yoke 114.

As shown in Fig. 26 the normally loose and stationary gear 137 has an elongate hub 145 on which is loosely splined a clutch member 146 having at its outer end lugs cooperating with corresponding clutch lugs provided upon the inner face of worm gear 136 toward which said clutch member is yieldingly urged by a coiled spring 147 surrounding the same.

Normally the clutch member 146 is engaged by a cam detent arm 148 (Figs. 2, 11, 27 and 30) by which it is held away from, and out of mesh with, the clutch face of worm gear 136 so that gear 137, shaft 143 and the sleeve valve 57 are normally at rest. The detent arm 148 is fast on a horizontal rockshaft 149 journaled in bearings on frame 52 and to the outer end of which is fixed a depending arm 150. As shown in Figs. 2, 3, 27 and 29 the lower end of this depending arm is connected by a universal joint with one end of a link 151 whose opposite end is connected by a universal joint with the free end of a lever 152 that is pivotally mounted at 153 upon the top wall 12 of the base of the machine. A spring 154 connected with lever 152 normally holds the latter at the limit of its movement in one direction against a stop 155 herein shown as the flange at the lower end of one of the posts 50 so that it acts through the connections described to maintain the detent arm 148 (Figs. 2, 11, 27 and 30) in a position at the limit of its movement toward shaft 134 where it holds clutch member 146 out of engagement with the rotating gear 136.

The hub of lever 152 has a tangentially disposed socket 156 (Figs. 2 and 3) within which is slidably mounted a spring pressed abutment member or latch abutment 157 whereof one end is beveled and projects beyond socket 156 to cooperate with the free end of the cam lever 102 hereinbefore referred to. The outer exposed end of abutment latch 157 is provided with a flat side surface normally occupying a position in the path of the free end of lever 102 so that when the latter is swung on its pivot by one of the rolls 78 of a last jack mechanism the free end of said lever 102 moves past abutment 157 and in passing swings lever 152 which, through the connections described, momentarily lifts detent 148 (Figs. 2, 11 and 30) from its normal position between clutch members 146 and 136. This movement of the detent permits spring 147 (Fig. 26) to shift clutch member 146 into clutching engagement with worm gear 136 which acts through said clutch member to impart a single revolution to gear 137 and sleeve valve 57 whereupon clutch member 146 is again cammed out of engagement with the worm gear and stopped by detent 148. Thus detent 148, clutch member 146 and spring 147 are parts of a one-revolution-and-stop mechanism that is controlled and operated by the cam lever 102 to bring about a single revolution of sleeve valve 57 immediately upon arrival of a loaded jack mechanism in position beneath the filler depositing mechanism C (Figs. 1 and 11). It will be noted that when the loaded jack mechanism departs from this position the spring 104 (Fig. 3) restores lever 102 to its normal position, the nose at the free end of said lever wiping idly across the outer beveled end of latch abutment 157 as said lever is thus returned.

Near its upper end the cylindrical hopper 122 (Figs. 1 and 2) is provided at opposite sides with bearings supporting a horizontal transverse shaft 158 on one end of which is fixed a worm gear 159 that is continuously driven by a worm 160 fast on the upper end of the vertical shaft 44. At its opposite end the shaft 158 is connected by miter gears 161 with the upper end of a vertical shaft that is an integral part of the feed screw 130 referred to above. Thus all of the material-feeding screws as well as the paddles 127 (Fig. 11) are in motion while motor M (Fig. 4) is operating.

Near its middle the horizontal shaft 158 (Figs. 1 and 2) is connected by bevel gears 163 with the upper end of a vertical shaft 164 rotatably supported within a fixed bearing provided at the center of the hopper and to the lower end of this shaft are fixed approximately radial arms 165 each of which is provided at its outer end with an upright scraper blade 166 disposed close to and parallel with the cylindrical wall of the hopper. Shaft 164, arms 165 and blades 166 constitute a continuously rotating agitator which dislodges the filler material from the hopper wall and also sweeps said material toward and into the upper end of conduit 120.

The hopper can be conveniently loaded with filler material by placing a cylindrical container P with the viscous material in inverted position upon the conical section 122a of the hopper (Fig. 2). The material will then flow into the hopper while the entire mass is fairly well sealed from the atmosphere, which is often desirable.

After a predetermined quantity of filler material has been delivered on to the shoe at station C (Fig. 1) the next step movement of the turret head brings the shoe into position opposite the mechanism D which spreads, irons and distributes the deposited filler material within the forepart cavity of the shoe.

The horizontally and radially movable slide 41 of this mechanism D (Figs. 6 and 16) has at its inner end vertical ways within which is mounted a slide consisting of two telescopically associated sections, namely a lower section 167 (Figs. 16, 17 and 18) and an upper section 168. The lower section 167 has an upper shank portion the outside of which is rectangular in cross-section and which is slidably fitted within the vertical ways of slide 41 so that it is held against rotating on its vertical axis. The upper end portion of the shank has a cylindrical bore 169. The upper section 168 has a tubular lower end portion slidably fitted within the bore 169. At the upper end of this cylindrical portion there is provided a rectangular flange 170 which slidably fits within the ways of slide 41 within which the shank 167 is also mounted, thereby to hold said upper section 168 against rotation on its axis.

A screw 171 (Figs. 17 and 18) extends downwardly through the tubular upper section 168 with its lower threaded end screwed into a tapped hole in the lower section 167, the engagement of the head of this screw with the upper end of section 169, serving to limit relative endwise movement of the two sections away from each other under the influence of a coiled spring 172 arranged within the tubular section 168.

The upper end of this spring 172 abuts the section 168 and its lower end abuts section 167, the spring being assembled under substantial initial compression so as to firmly yet yieldingly maintain the slide 167—168 extended as shown in Figs. 16, 17 and 18, while the lower end thereof is not in engagement with a shoe.

The lower slide section 167 has a yoke 173 within which is loosely inserted a metal shoe or pad 174 mounted for independent rocking movement on the axes of two relatively perpendicular pintles 175 and 176 by which said shoe or pad is connected with the oppositely disposed legs of the yoke 173. At its upper end the slide section 168 is provided with a cam roll 177 which is yieldingly held against a cam rail 178 (Figs. 1, 6 and 16) by a pair of coil springs 179 (Fig. 17) whose joint effective strength is less than that of the spring 172. Each of these two springs is seated within a vertical chamber provided within the head at the inner end of slide 41 and has seated upon its upper end the head of a screw 180 whose shank extends downwardly through its spring and loosely through a hole provided at the bottom of its chamber to the yoke 173 to which its lower end is rigidly connected.

The cam rail 178 is fixedly bolted in position against one side of the upstanding bracket 42

(Figs. 6 and 16) and it will be clear that the springs 172 and 179 (Fig. 17) yieldingly hold the cam roll 177 of the combination slide 167—168 against the cam rail at all times during the movements thereof back and forth with slide 41. At its inner end the cam rail 178 has, upon its under side, an incline 178a, which forces the upper section 168 of the combination slide downwardly as slide 41 nears the limit of its movement toward the axis of the turret head, and against which the roll 177 is maintained by the springs at the start of the outward movement of slide 41 in the opposite direction.

After the shoe has received, at position c (Fig. 1), a metered quantity of filler material, the turret head has another step movement imparted to it which brings the shoe into position d where it is opposite the upstanding bracket 42 of mechanism D. Immediately after arrival at this position the slide 41 nears the limit of its inward movement toward the axis of the turret head thus causing the cam roll 177 to descend on cam 178a and the pad 174 to move obliquely downwardly into position on top of the forepart of the shoe, the latter part of this movement of the slide 41 causing the pad to slide on said forepart and the gimbal joint 175—176 (Fig. 17) permitting the same to fit itself to said forepart.

The pad 174 seats upon the top of the shoe and upon the filler material thereon before roll 177 reaches the lower end of cam incline 178a so that during the remainder of the downward movement of the roll the upper section 168 of the combination slide 167—168 is adjusted downwardly relatively to the lower section 167 thereby compressing spring 172. During the first part of the movement of roll 177 down the cam incline 178a, prior to the engagement of the pad 174 with the lasted shoe, only the springs 179 are compressed, but after such engagement, and until the roll 177 reaches the bottom of cam incline 178a, the spring 172 only is gradually compressed, the springs 179 being disturbed only by unevenness or inclination of the forepart of the lasted shoe relatively to the horizontal path of slide 41.

Thus during each inward movement of slide 41 the pad 174 moves obliquely downwardly into engagement with the forepart after which it slides inwardly for a substantial distance under the pressure of spring 172, and during each outward movement of slide 41 the pad 174 first slides outwardly on the forepart for a substantial distance while under the pressure of spring 172; then obliquely upwardly away from the forepart, and then outwardly on a horizontal path for a substantial distance. As the pad 174 is guided horizontally by rail 178 during its back and forth movements a lubricant is automatically applied to its flat bottom surface by a lubricating device which is indicated generally at 181 in Figs. 6 and 16 and shown in detail in Figs. 21 to 24, inclusive.

This lubricating device comprises a vessel 182 in the form of a trap rigidly fastened by screws to one side of bracket 42. Pivotally mounted at 183 on the top of vessel 182 is a frame or yoke 184 on the free end of which is journaled a pair of parallel and contacting, freely rotatable rollers 185 and 186 disposed one above the other, the roller 186 being partly submerged in a body of liquid lubricant 187 maintained within the vessel 182.

The free end of frame 184 rests upon two plungers 188 each of which is supported by a spring 189 mounted within a pocket provided in vessel 182, these springs acting through the plungers yieldingly to support frame 184 in an elevated position against a pair of stops 190 projecting from said vessel, with the upper portion of roller 185 in the path of the bottom portion of the pad 174 when the roll 177 of combination slide 167—168 (Fig. 17) is travelling back and forth against the upper horizontal portion of rail 178.

During these back and forth movements of the pad the latter passes over the roller 185 which rotates against the bottom side of the pad and transfers lubricant to the same. The lower roller 186 is frictionally driven by roller 185 and acts to transfer lubricant from vessel 182 to roller 185.

Alongside of the rollers 185 and 186 there is provided a doctor blade 191 (Figs. 20, 21, 23 and 24) mounted on one end of vessel 182 so that it is vertically movable. This doctor blade occupies a vertical groove provided upon the inner face of a plate 192 fastened by screws to the end of vessel 182 and is supported by plungers 193 which, in turn, are yieldingly urged upwardly by springs 194. The engagement of lugs 195 provided at the opposite ends of doctor blade 191 (Fig. 23) with abutments provided upon the inner face of plate 192, serves to limit the upward movement of the blade under the influence of the spring-pressed plungers and maintains the top edge of the blade in position to scrape against the bottom side of the pad 174 thereby to remove surplus lubricant from the latter.

The top wall of vessel 182 is provided with a tapped hole into which is screwed the lower end of a pipe conduit 196 whose upper end communicates with the bottom of the interior of an airtight container 197 holding a reserve supply of the liquid lubricant. The lower end of the pipe conduit 196 extends downwardly into vessel 182 a short distance and, owing to barometric action, the level of the lubricant within the vessel will automatically be maintained at a predetermined height closely adjacent to the lower extremity of the pipe conduit.

The container 197 is shown as provided with a removable cap 198 normally closing a nipple 199 through which the contents of the container may be replenished as necessary. A normally open shut-off valve 200 is provided in conduit 196 which is closed while this replenishing operation is being carried out.

Recapitulating the above-described functions of the several correlated groups of operative elements of the herein-described embodiment of a machine according to my invention, an entire cycle of operation will now be outlined.

The operator places a lasted partly made shoe on the jack in position a, where it is unlocked due to the function of cam 91 (Fig. 9). The heel of the shoe is first placed within crotch 80 of the heel-rest slide, whereupon the slide and shoe are forced outwardly until the toe end can be placed in position against the turret head between gauge plate 51 and roll 81 (Fig. 6), care being taken to position the bottom of the forepart approximately horizontal by an up or down movement of the heel part. Exactly horizontal position of the forepart however is not necessary due to the peculiar construction of the spreading and ironing pad.

The roll 78 now occupies a position which defines the size of the shoe as derived from its total length; this position is fixed as soon as the shoe moves into the next position b where cam 91 causes locking of the jack as above described.

With the shoe moving into position c, roll 78 first rotates cam lever 102 (Figs. 2 and 3) into a position which, through linkage 102—106—107—111—116—117—61—64 determines a certain rotation of quantity predetermining sleeves 63, 64, which rotation defines that opening of the filler discharge port which corresponds to the size of the shoe now in position c. Lever 102 next operates link train 153—152—150—149—148—146—137—142—144—60 thereby causing discharge of the filler through rotation of sleeve 59 so that opening 58 passes stationary port 56 and metering opening 65.

It will be remembered in this connection that cam lever 102 is not actuated if, with the respective jack empty, roll 78 is in its innermost position in turret slot 79.

It will further be remembered that the filler material, kept out of contact with the atmosphere by pot P, is continuously circulated through delivery chamber 55 and maintained under pressure therein so that discharge will instantaneously begin as soon as the discharge port begins to open; the appropriately predetermined amount of filler is cut off by opening 58 returning into normal position, as shown in Fig. 11.

The shoe, still locked in its jack, now moves into position d. As pointed out above, immediately upon arrival of the shoe in this position, the lubricated pad 174 slides obliquely down upon the shoe material and due to the gimbal arrangement 175—176 levels the filler material with respect to the shoe. At the same time, the filler spreads out upon the shoe. The pad 174 now slides upon the filler material toward the toe portion of the shoe distributing the filler material firmly throughout this area. Now the pad 174 slides back toward the shank portion of the shoe completing the spreading, distributing and ironing operation. At this point the pad 174 is retracted obliquely and upwardly on its way to be lubricated and scraped for another operation.

The jack now moves into position e where it is unlocked so that the shoe can be removed. The next movement returns the jack, still unlocked, into position a where it is ready to receive another shoe.

It should be understood that the present disclosure is for the purpose of illustration only and that this invention includes all modifications and equivalents which fall within the scope of the appended claims.

I claim:

1. In a machine of the type described a spreading and ironing mechanism comprising means for supporting an article; a spreading and ironing pad; a pad holder; a mount in fixed relation to a predeterminable position of said supporting means; means for slidable supporting said pad holder on said mount; and means for shifting said pad holder with said pad on said mount from a position of rest into a predeterminable position for spreading and ironing said material on said article and back into said position of rest.

2. In a machine of the type described an ironing mechanism comprising means for supporting a shoe with its sole portion uppermost; a filler spreading pad; a pad holder; a mount in fixed relation to a predeterminable position of said supporting means; means for movably supporting said pad holder on said mount; and means for sliding said pad holder with said pad on said mount from a position of rest into a predeterminable position for spreading and distributing filler material on said sole portion and back into said position of rest.

3. Mechanism according to claim 2 wherein said pad holder includes a member supporting said pad for substantially vertical movement and urging it upwardly and wherein said shifting means includes track means permitting substantially horizontal movement of said holder on said mount, in combination with cam means on said mount engaging said supporting member for moving it vertically while shifting on said track means.

4. Mechanism according to claim 2 including means associated with said mount for scraping said pad as it shifts into said position of rest.

5. Mechanism according to claim 2 including means associated with said mount for lubricating said pad as it shifts into said position of rest.

6. Mechanism according to claim 2 wherein said pad is secured in said pad holder by a gimbal mounting which permits restricted rotation about mutually perpendicular axes substantially parallel to the sliding motion of said holder when spreading and distributing said material.

7. Mechanism according to claim 6 including means associated with said mount for scraping said pad as it shifts into said position of rest.

8. In a machine of the type described, a plastic distributing mechanism comprising: a spreading and ironing pad; a normally elevated holder for said pad; and means for lowering said holder, progressively compressing said pad on said plastic, slidably moving said pad on said plastic in two directions, and returning said holder to its normally elevated position.

9. In a machine of the type described, a plastic distributing mechanism comprising: a spreading and ironing pad; and means for lowering said holder, progressively compressing said pad on said plastic, horizontally sliding said holder on said plastic in opposite directions, and returning said pad to its normal position.

10. A machine of the type described having, in combination, means for supporting a shoe; filler leveling and ironing means mounted on said machine and being movable substantially in a horizontal plane; means for moving said shoe supporting means into and out of cooperative relationship with said mechanism; and means for operating said mechanism when said supporting means and said mechanism are in cooperative relationship.

CARL F. HAMMANN.

No references cited.